(12) United States Patent
McCain

(10) Patent No.: US 11,118,748 B1
(45) Date of Patent: Sep. 14, 2021

(54) REFLECTOR-LESS SINGLE LENS VEHICLE LAMP

(71) Applicant: Diode Dynamics, LLC, Maryland Heights, MO (US)

(72) Inventor: Paul McCain, St. Charles, MO (US)

(73) Assignee: Diode Dynamics, LLC, Maryland Heights, MO (US)

( * ) Notice: Subject to any disclaimer, the term of this patent is extended or adjusted under 35 U.S.C. 154(b) by 0 days.

(21) Appl. No.: 17/080,430

(22) Filed: Oct. 26, 2020

(51) Int. Cl.
| F21S 41/255 | (2018.01) |
| F21S 41/153 | (2018.01) |
| F21S 41/33 | (2018.01) |
| F21Y 115/10 | (2016.01) |
| B60Q 1/24 | (2006.01) |

(52) U.S. Cl.
CPC .......... F21S 41/255 (2018.01); F21S 41/153 (2018.01); F21S 41/337 (2018.01); *B60Q 1/24* (2013.01); *F21Y 2115/10* (2016.08)

(58) Field of Classification Search
CPC ...... F21S 41/255; F21S 41/265; F21S 41/153; F21S 43/20; F21V 5/007
See application file for complete search history.

(56) References Cited

U.S. PATENT DOCUMENTS

| 6,270,242 B1* | 8/2001 | Suzuki | B60Q 1/0466 362/546 |
| 7,066,626 B2 | 6/2006 | Omata | |
| 7,781,787 B2 | 8/2010 | Suehiro | |
| 7,887,197 B2 | 2/2011 | Iwanaga | |
| 9,039,238 B2* | 5/2015 | Kim | F21V 29/713 362/294 |
| 9,494,725 B2 | 11/2016 | Takahashi | |
| 9,676,322 B2 | 6/2017 | Leang | |
| 9,816,677 B2 | 11/2017 | Takahashi | |
| 10,060,592 B2* | 8/2018 | Yan | F21S 41/151 |
| 10,099,438 B2 | 10/2018 | Bae | |

(Continued)

FOREIGN PATENT DOCUMENTS

JP          201695954          5/2016

OTHER PUBLICATIONS https://www.bajadesigns.com/products/Squadron-SAE.asp, Baja Designs Squadron SAE, 257805, first accessed prior to Oct. 26, 2020.

(Continued)

*Primary Examiner* — William N Harris
(74) *Attorney, Agent, or Firm* — Cathy J. Futrowsky; Evans & Dixon, LLC

(57) ABSTRACT

A lamp includes a housing, a lens module and bezel. The lens module has one or more integrally formed lens units. Each lens unit has an emission surface and a light gathering portion. The light gathering portion includes an incident surface. Each lens unit has a solid light-path portion formed from the light transmitting material and disposed between the incident and emission surfaces. The emission surface of each lens unit is a portion of the outer surface of the module. The lamp includes one or more light sources, each projecting light to the incident surface of a lens unit. The lamp excludes any reflecting structures directing light to the incident surface of a lens unit. The sealing bezel seals the lens module to the housing. When sealed, the lamp includes no other light-transmitting structures external to the outer surface of the lens module.

8 Claims, 26 Drawing Sheets

(56) References Cited

U.S. PATENT DOCUMENTS

| | | | |
|---|---|---|---|
| 10,240,742 B2 | 3/2019 | Krotoska | |
| 10,612,740 B2 | 4/2020 | Ueno | |
| 10,627,553 B2 | 4/2020 | Dellock | |
| 2008/0043485 A1* | 2/2008 | Koerner | F21S 41/55 362/521 |
| 2010/0165652 A1* | 7/2010 | Ookubo | F21S 41/255 362/522 |
| 2010/0165653 A1* | 7/2010 | Ookubo | F21S 41/155 362/539 |
| 2010/0309660 A1* | 12/2010 | Lim | F21S 45/47 362/231 |
| 2014/0192547 A1* | 7/2014 | Kumar | F21S 43/20 362/522 |
| 2015/0252975 A1* | 9/2015 | Nakada | F21S 41/265 362/521 |
| 2017/0167668 A1* | 6/2017 | Uenoyama | F21V 17/12 |
| 2018/0149336 A1* | 5/2018 | Tsai | F21S 41/143 |
| 2019/0128501 A1* | 5/2019 | Chen | F21V 19/002 |
| 2019/0242544 A1 | 8/2019 | Chen | |
| 2019/0301705 A1* | 10/2019 | Schickel | F21S 41/322 |

OTHER PUBLICATIONS https://www.rigidindustries.com/d-series-sae-fog-light-2-504813.html, Rigid Industries D-Series SAE, 504813, first accessed prior to Oct. 26, 2020.
https://www.kchilites.com/4-gravity-led-fog-jeepjk-10-18.html, first accessed prior to Oct. 26, 2020.
Advertisement for Street Legal Series 3" Cube Pod Light for lamp with multiple lenses, first discovered prior to Oct. 26, 2020.

* cited by examiner

REFLECTOR-LESS SINGLE LENS VEHICLE LAMP

CROSS REFERENCE TO RELATED APPLICATION

Not Applicable.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

This invention relates generally to vehicle lamps and more specifically to automotive LED work lights or off-road lamps.

BACKGROUND OF THE INVENTION

Automotive work lights or "off-road" lamps are low-voltage lamps designed to be installed as auxiliary lamps on cars and pick-up trucks. Such lamps may also be used to replace factory installed lighting elements such as fog lights or driving lights found on vehicles. In the recent past the lamps used emission or light sources such as halogen bulbs. Some high-end automobiles use high intensity discharge (HID) lamps. However, currently the preferred light source for auxiliary application lamps is a light emitting diode (LED). To produce a desired beam pattern, light from the LED must pass through optical components with specifically designed geometries so that the light can be aligned in specific directions and form a desired beam pattern. Usually this requires multiple lenses, but in any case at least one sealing lens that seals the optical components to protect them from the environment. In the case of off-road applications, the outer, sealing lens is made flat, which requires that the lamp and lens be made to a greater standard of durability.

Regardless of the emission source type, for such lamps to have any practical application, the light issuing from the light source must be modulated into a useful beam pattern, either focused or spread from the lamp in a pattern based upon its intended use. The automotive lamps known in the prior art effect this modulation in one of two ways, each requiring a plurality of lenses to generate a desired beam pattern. The first method known in the art utilizes an assembly of two or more lenses. The first lens collimates the light emanating from an LED. After passing through the first lens, the light may pass through one or more secondary lenses that spread light into a functional pattern. An additional lens, typically one that is flat and smooth, forms an outer lens to seal the lamp.

The second method known in the art utilizes an assembly of one or more lenses and a reflector to direct the emitted light. A lamp using this light-directing method includes a reflector and a light source at or near the focal point of the reflector. The reflector collimates or spreads the light issuing from the light source to create a desired pattern. The reflector commonly includes a poly-ellipsoid rear portion and, depending upon the application, flat wall sections between the rear portion and the front of the lamp assembly. In front of the light source is the main light-modulating lens (a/k/a "projection lens). Typically, the lens, the reflector, or a combination of both are designed to direct the light from the light source into a specified pattern. This lamp type also uses a second, outer lens to encapsulate the lamp and its components.

With the prior art lamp the light source typically comprises an LED fixed to a substrate or surface, such as a printed circuit board (PCB). In those lamps utilizing a reflector, the reflector is fixed to a substrate or surface and positioned so as to direct light emitted by the LED forward and into the projection lens. The reflector typically has an inner surface that is elliptically-shaped and coated or covered with a polished material that amplifies the reflectivity of the inside portion of the lamp and causes light to converge on the lens. More specifically, the modern reflector is a concave or parabolic article commonly made of a compression-molded or injection molded plastic such as polycarbonate or polymethyl methacrylate. Glass and metal optic reflectors also exist. The functional concave or parabolic surface of the reflector surrounds the LED and has applied to it a reflectively amplifying metallic coating such as aluminum, silver or chrome deposited on a smooth and polished plastic, brass or glass surface. Often a clear overcoat is applied over the metallic coating to prevent oxidation. As used in this application, the term reflector therefore means structure having a surface upon which there has been applied a reflectively amplifying coating (metallic or non-metallic) that concentrates light from a light source.

There are several deficits associated with the known constructs for automotive vehicle lamps. First, in the case where multiple lenses are utilized in series, a measure of optical inefficiency is introduced into the system. This is because with each lens some amount of light is reflected rather than transmitted. Second, the more lenses a lamp has, the heavier it is. Third, the more complex its assembly is, the more complicated it is to place the lenses in alignment. Fourth, a lamp with multi-lens optics must be manufactured so that the lenses maintain alignment over the life of the lamp. In the case of lamps intended for off-road use, this means the lamps must be made robustly. Fifth, in the known prior art lamp, an air gap exists between an outer lens and the other optical components of the lamp. This generally operates to insulate the outer lens thermally from the heat-generating electronics. However, this construct results in poor winter performance, as snow and ice can build up on the outer lens. It would therefore be beneficial if a vehicle lamp could be constructed that achieves the illuminating utilities known in the art without the associated deficits.

SUMMARY OF THE INVENTION

The invention herein is directed to an improved and novel lamp assembly with particular beneficial application as a work light or auxiliary light for automotive use. The inventive lamp assembly achieves automotive light emission standards in a manner that departs from the prior art in that it utilizes neither a reflector nor an encapsulating outer lens. In fact, an embodiment inventive lamp includes fewer parts than competitive products and produces desired automotive beam patterns via a single lens module. The single lens module produces the desired beam pattern while serving as the main outer lens cover and thus eliminates the need for multiple lenses as is known in the art. Because the encapsulating outer lens is eliminated, the inventive lamp also eliminates the air gap between the light-manipulating optics and the outer lens cover. By eliminating the air gap between the cover and the light-modulating lens, a lamp built in accordance with the features described in this application provides improved winter performance because the outer lens surface maintains a higher temperature and more easily melts snow and ice in comparison with prior art devices.

A preferred embodiment of the present invention lamp comprises a housing and a molded lens module made of a light-transmitting material. The lens module has an outer surface and an inner surface. The lens module includes one or more lens units integrally formed in the light-transmitting material of the lens module. Each lens unit has an emission surface and a light gathering portion. The light gathering portion includes an incident surface. Each lens unit further includes a solid light-path portion formed from the light-transmitting material and disposed between the incident surface and the emission surface of the lens unit. The emission surface of each of the one or more lens units is a portion of the outer surface of the lens module.

The lamp further includes one or more light sources. Each of the one or more light sources directly projects light to the incident surface of a respective one of the one or more lens units. Unlike the lamps of the prior art, the embodiment the lamp excludes a reflector or any reflecting structures shaped or positioned to direct the light projected by a light source to the incident surface of its respective lens unit. The lamp includes a sealing bezel and a seal (a/k/a a gasket) that seals the lens module to the housing. When the lens module is sealed to the housing by the sealing bezel and seal, the lamp includes no other light-transmitting structures external to the external surface of the lens module.

DETAILED DESCRIPTION

Figure 1:
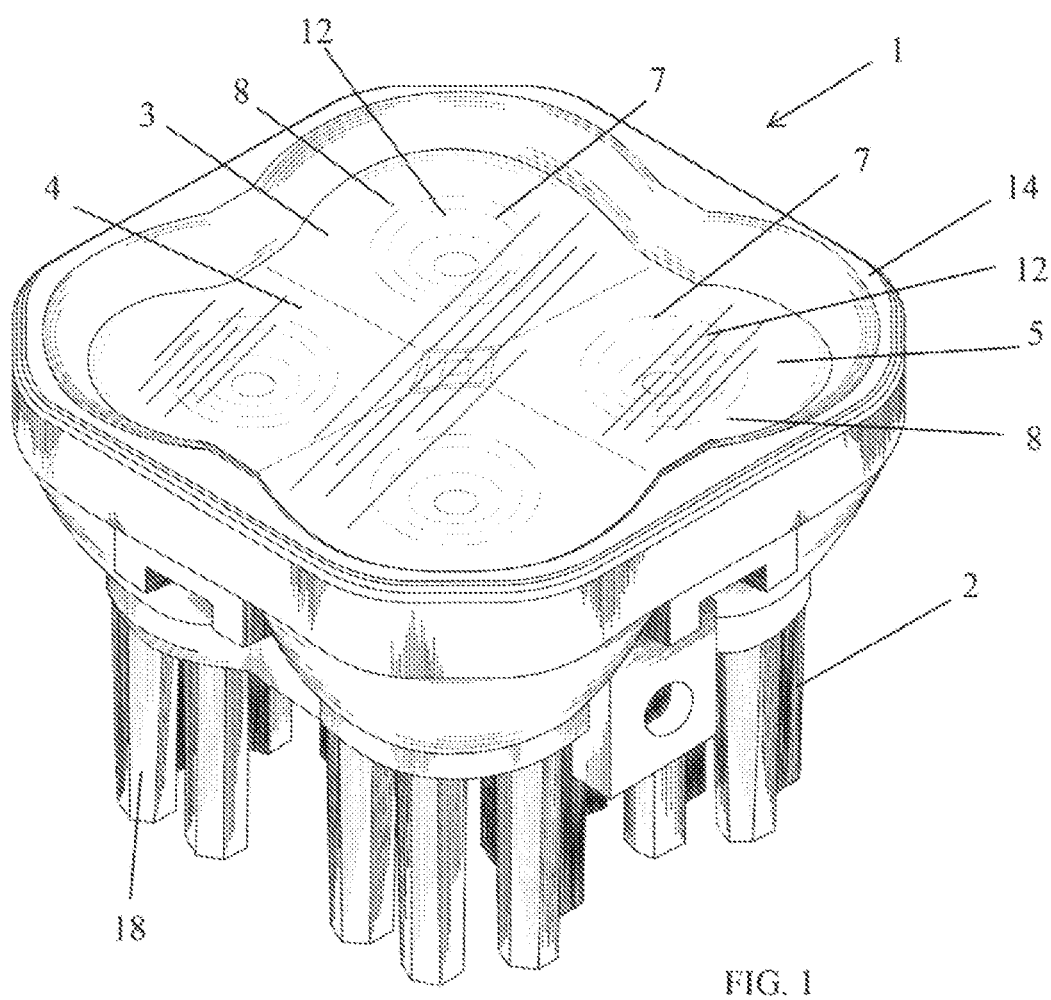
FIG. 1 is a perspective view of a preferred embodiment lamp according to the present invention.

The present disclosure provides a novel lamp having particularly beneficial application for use as a general driving lamp, flood lamp, spot lamp and fog lamp. Other applications are possible. The disclosure is described in the context of preferred embodiments with reference to the drawings. The following descriptions of various embodiments of this invention are presented herein for purpose of illustration and giving examples only. The disclosure recited herein is not intended to be exhaustive or to be limiting to the precise form of the invention disclosed. In addition, the disclosure of alternative examples is not meant to be exhaustive. The embodiments herein may be capable of being practiced or being carried out in various ways. Also, it may be appreciated that the phraseology and terminology used herein is for the purpose of description and should not be regarded as limiting as such may be understood by one of skill in the art.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise.

Similarly, spatially relative terms, such as "beneath," "below," "lower," "above," "upper" and the like, are used herein for ease of description to describe one element's or feature's relationship to another element or feature in accordance with orientations illustrated in the figures. It will be understood that the spatially relative terms are intended to encompass different orientations of the device in use or operation in addition to the orientation depicted in the figures.

It will be understood that, although the terms first, second, third etc. may be used herein to describe various elements, components, regions, layers, or steps, these elements, components, regions, layers or steps should not be limited by these terms. Unless the context indicates otherwise, these terms are only used to distinguish one element, component, region, layer, or step from another element, component, region, or step, for example as a naming convention. Thus, a first element, component, region, layer, or step discussed below in one section of the written description of the specification could be termed a second element, component, region, layer, or step in another section of the specification or in the claims without departing from the teachings of the present invention. In addition, in certain cases, even if a term is not described using "first," "second," etc., in the written description of the specification, it may still be referred to as "first" or "second" in a claim in order to distinguish different claimed elements from each other.

FIG. 1 is a perspective view of a preferred embodiment lamp according to the present invention. FIGS. 2A-7 depict preferred embodiment components of inventive lamp 1. As shown in the figures, a preferred embodiment lamp 1 comprises a housing 2 and a lens module 3 made of a light-transmitting material 4. Lens module 3 has an outer surface 5 and an inner surface 6.

Lens module 3 includes one or more lens units 7 integrally formed, preferably by molding, in the light-transmitting material 4 of lens module 3. Each lens unit 7 has an emission surface 8 and a light gathering portion 9. Light gathering portion 9 includes incident surface 10. Each lens unit 7 further includes a solid light-path portion 11 formed from the light transmitting material 4 and is disposed between incident surface 10 and emission surface 8 of the lens unit 7. Emission surface 8 of each of the one or more lens units 7 is a portion 12 of outer surface 5 of lens module 3.

Figure 2A:
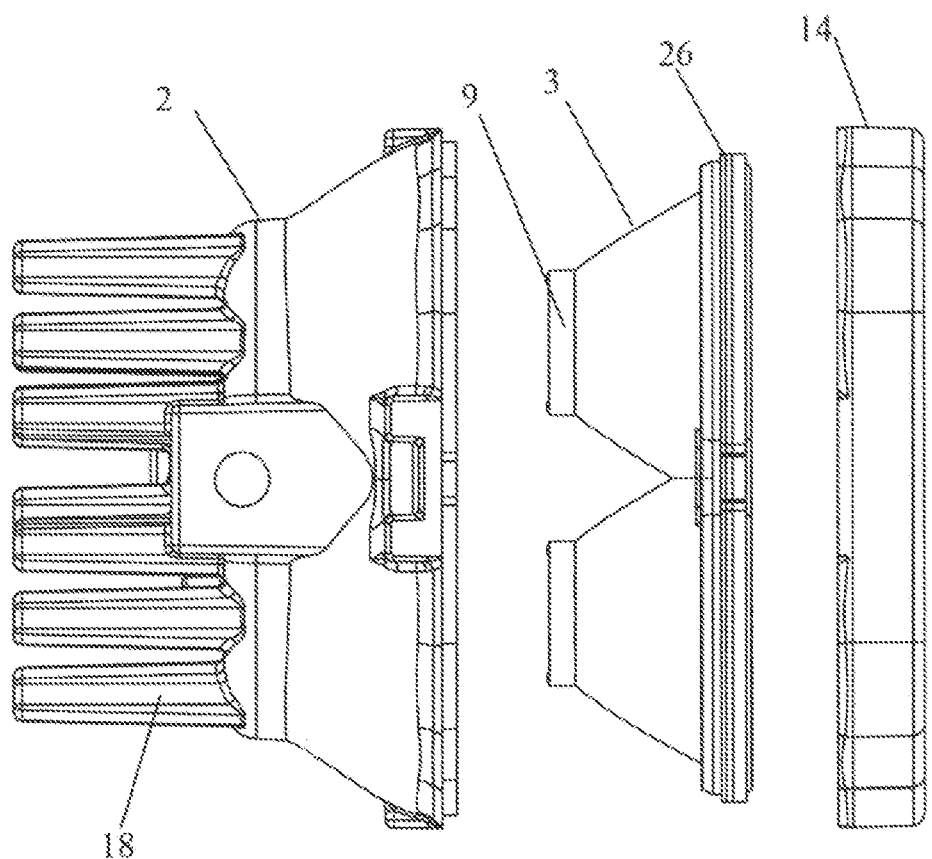
FIG. 2A is an exploded elevation view of a preferred embodiment lamp according to the present invention showing the serial arrangement of the housing, lens module and bezel to form the lamp.
Figure 2B:
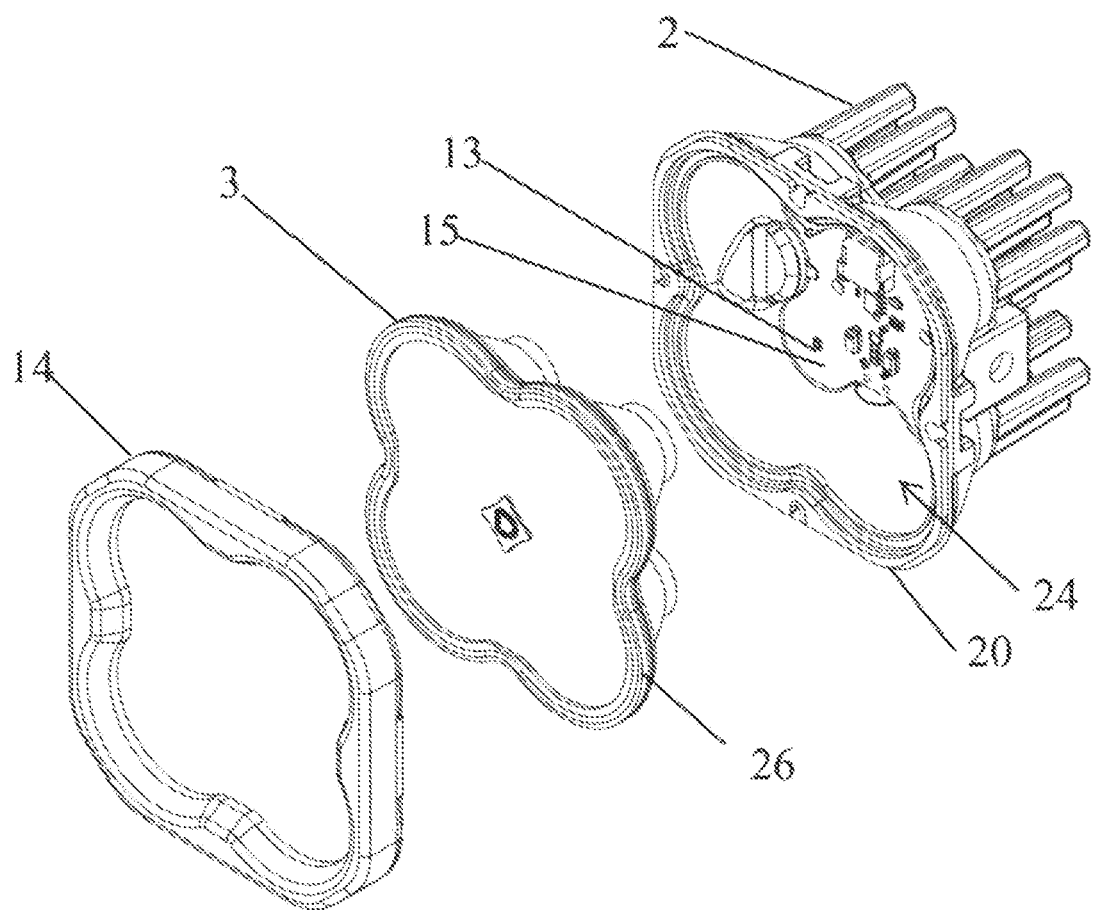
FIG. 2B is an exploded perspective view of a preferred embodiment lamp according to the present invention showing the serial arrangement of the housing, lens module and bezel to form the lamp, with the lamp's PCB installed in the housing.
Figure 2C:
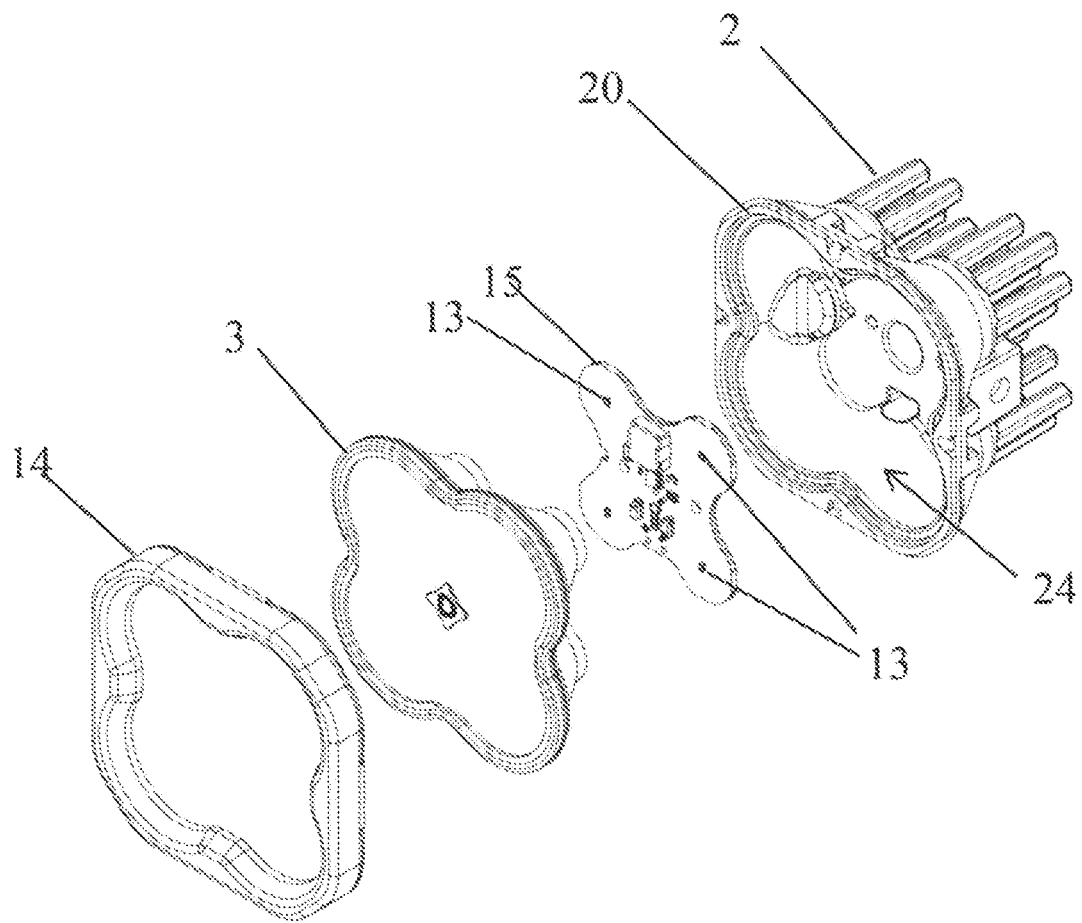
FIG. 2C is a similar view as that of FIG. 2B, except that the PCB is shown separated from the housing for clarity of illustration.

As is best seen in FIGS. 2B and 2C, lamp 1 includes one or more light sources 13. In the preferred embodiment, a light source 13 is a solid-state light source such as a light-emitting diode (LED) mounted on PCB 15 secured in housing 2. Preferred embodiment lamp 1 depicted in the figures has a plurality of four LEDs 13 mounted on PCB 15. This is merely exemplary as lamp 1 may have more or less light sources or LEDs 13 based upon need. Lamp 1 may include a light engine to drive LEDs 13 and regulate power to them and thereby manage their display. In addition, a light engine can manage the thermal output of LEDs 13 and provide protection to lamp 1. As is well-known in the art, PCB 15 includes traces (not shown) that receive power and control signals from electric leads (not shown). Heat from LEDs 13 is transferred to housing 2, which may be formed of metal or thermo-conductive plastic.

Figure 7:
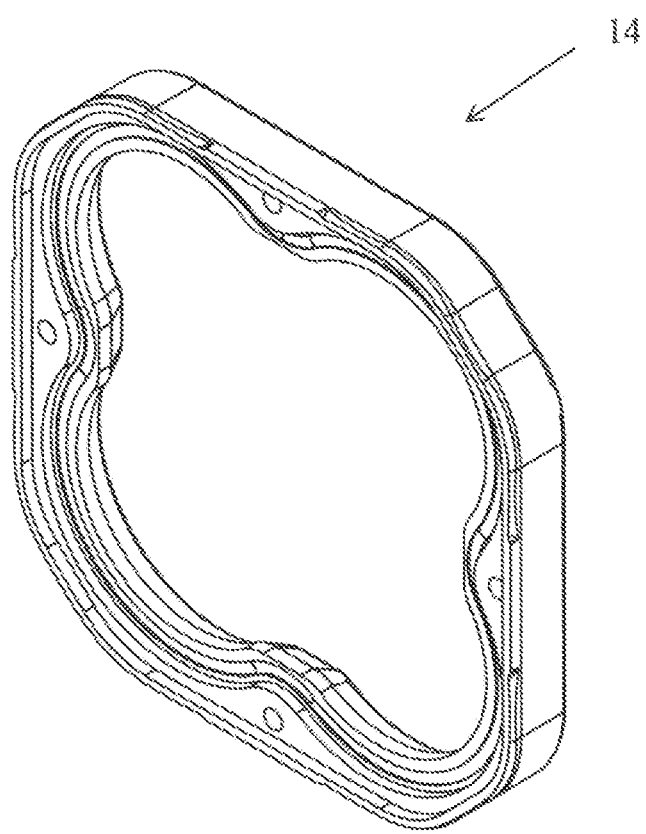
FIG. 7 is a perspective view showing the internal surface of the sealing bezel of a preferred embodiment lamp of the present invention.
Figure 8A:
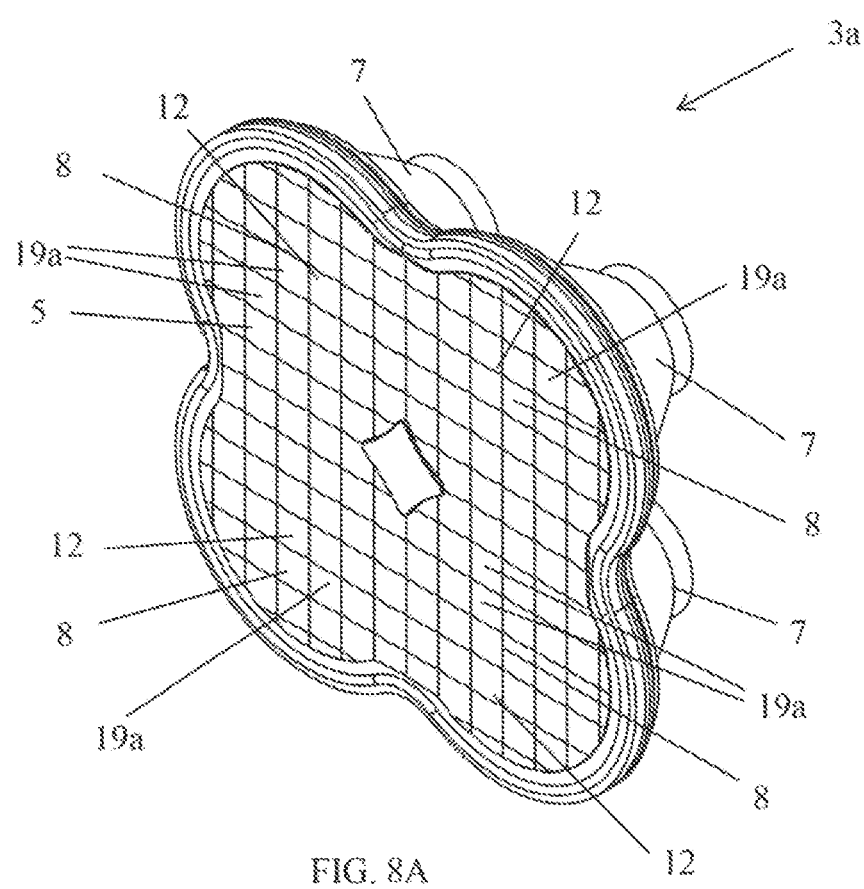
FIGS. 8A-8D are respectively a perspective view, rear elevation view, front elevation view and section view of a first embodiment lens module of a preferred embodiment lamp according to the present invention. The lens module has a plurality of lens units formed in it that create a light projection pattern useful for general driving conditions.
Figure 8B:
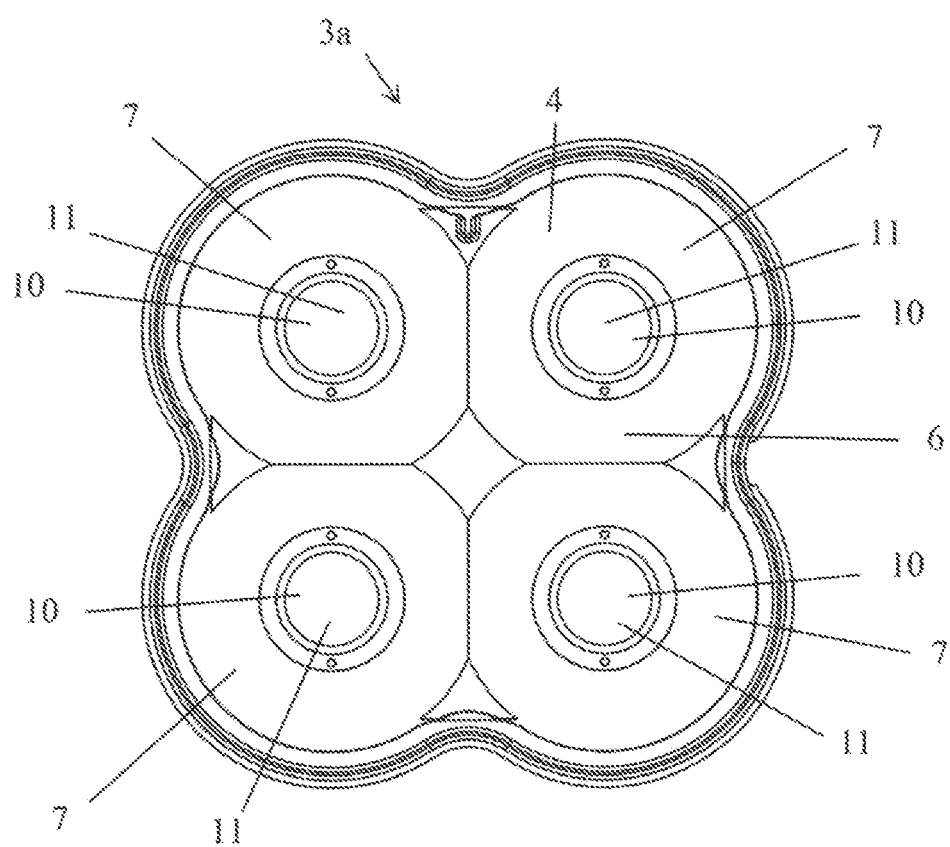
Figure 8C:
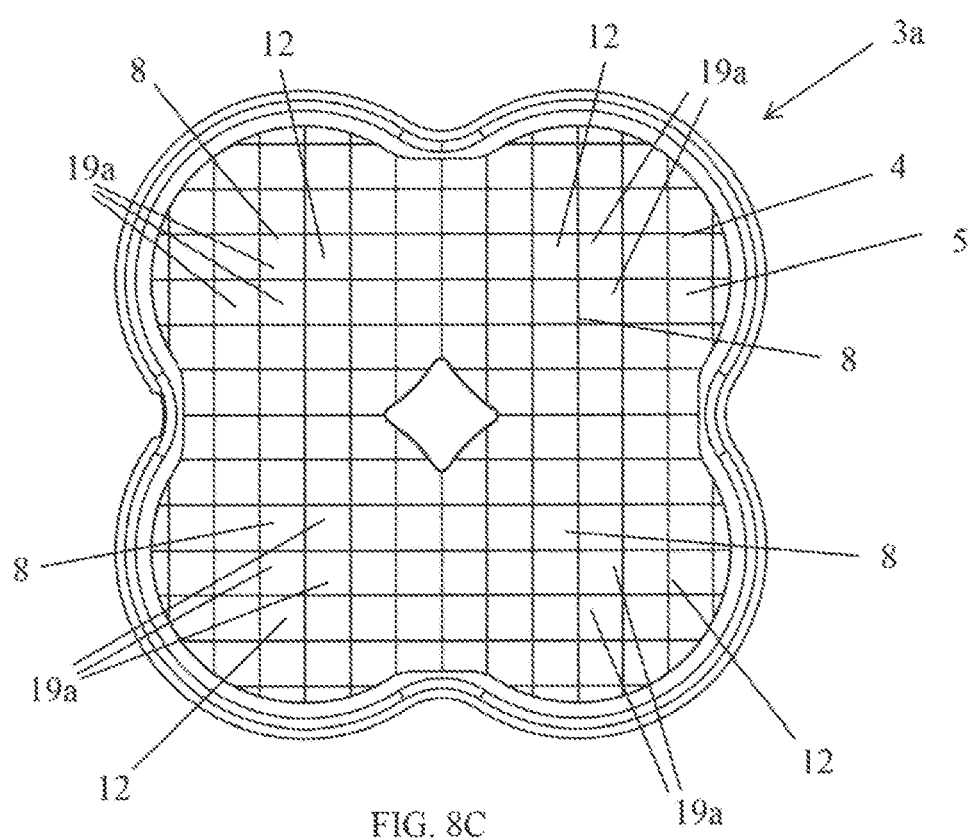
Figure 8D:
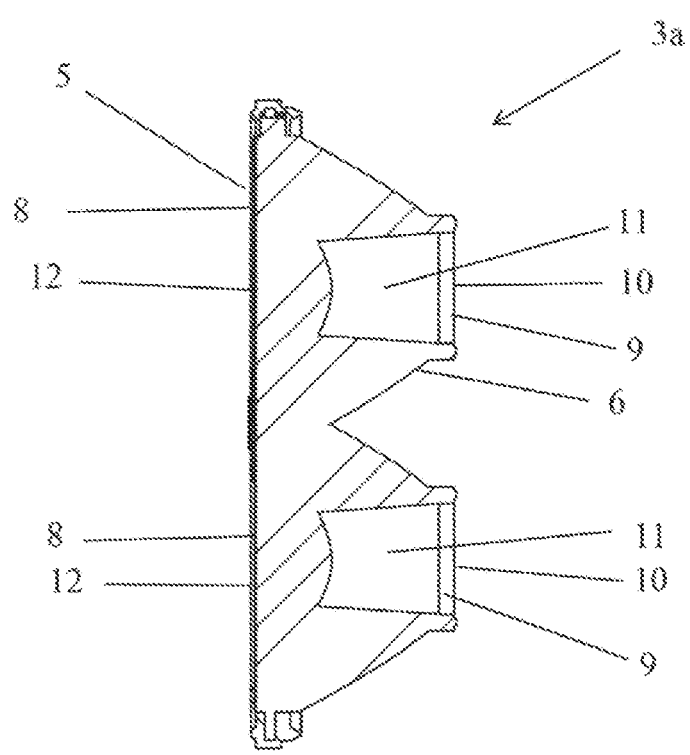
Figure 9A:
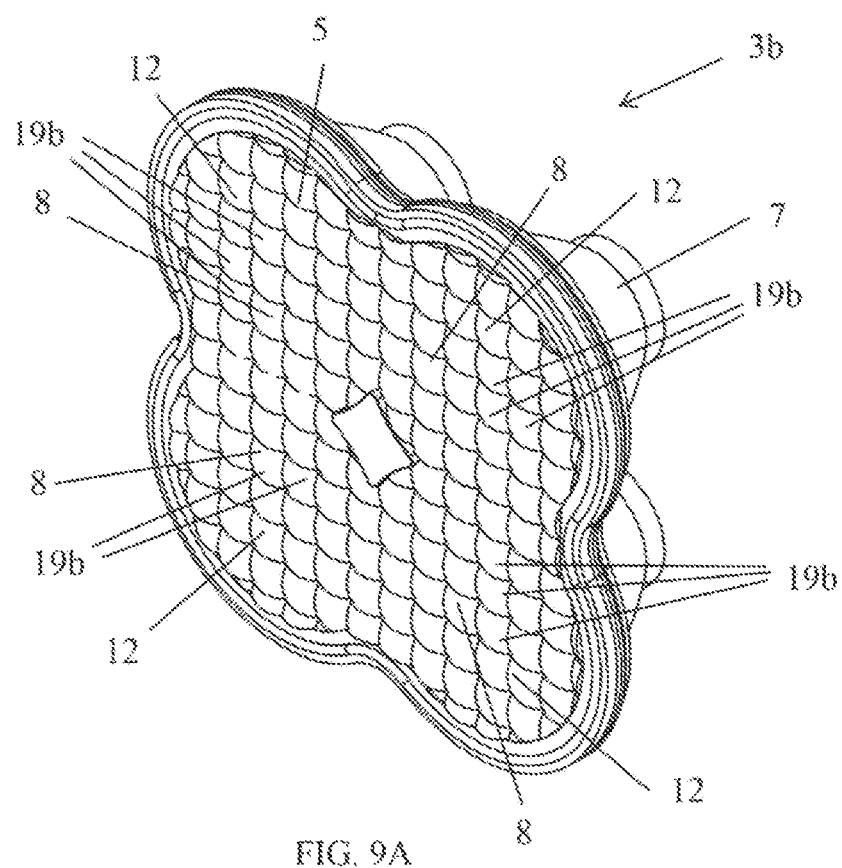
FIGS. 9A-9D are respectively a perspective view, rear elevation view, front elevation view and section view of a second embodiment lens module of a preferred embodiment lamp according to the present invention. The lens module has a plurality of lens units formed in it that create a light projection pattern useful for flood lights.
Figure 9B:
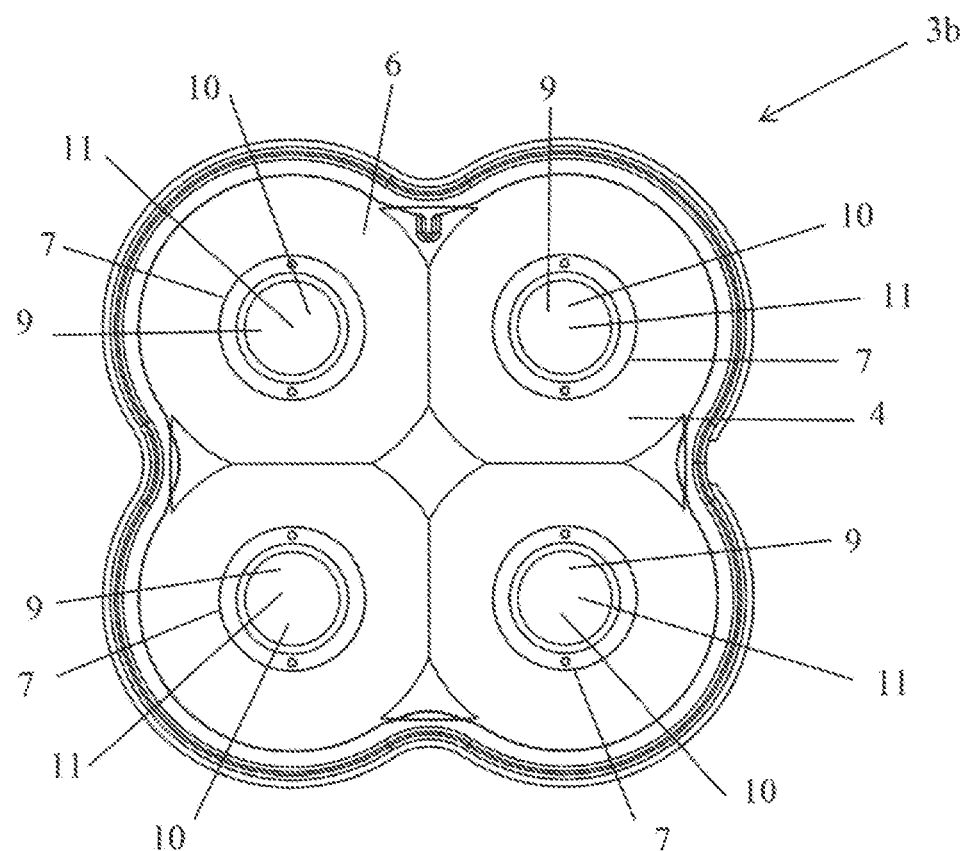
Figure 9C:
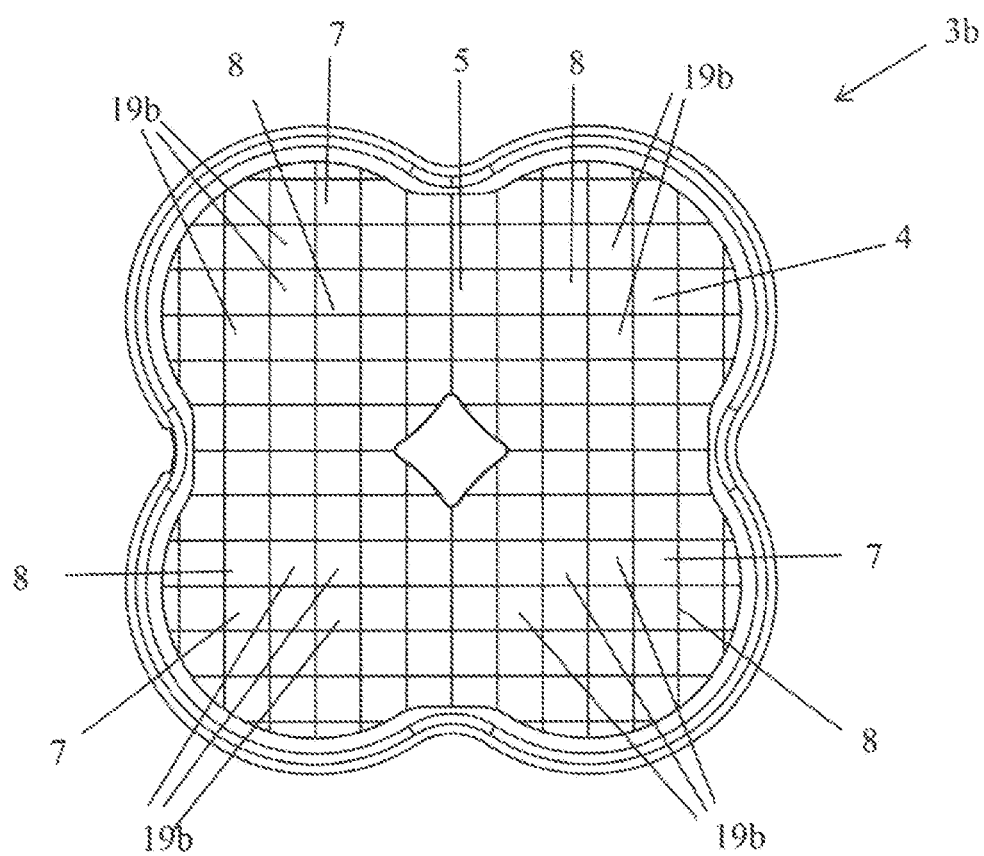
Figure 9D:
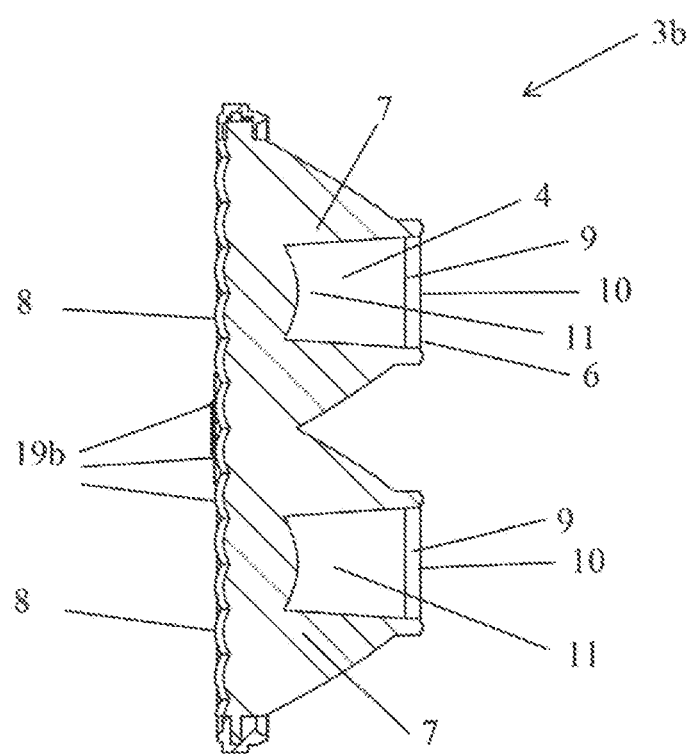
Figure 10A:
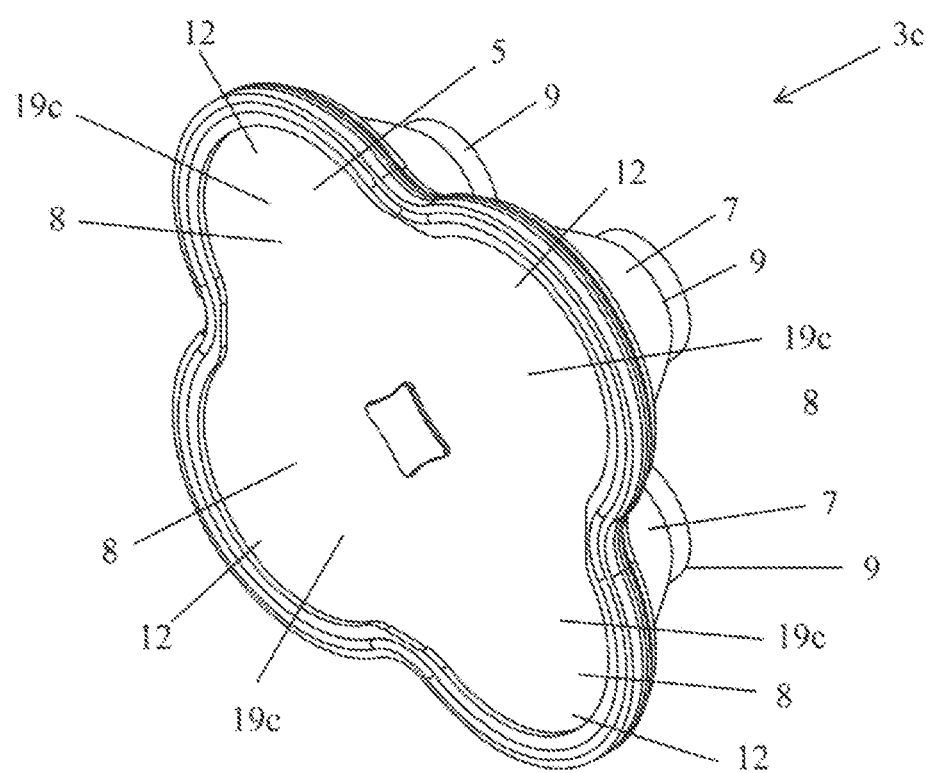
FIGS. 10A-10D are respectively a perspective view, rear elevation view, front elevation view and section view of a third embodiment lens module of a preferred embodiment lamp according to the present invention. The lens module has a plurality of lens units formed in it that create a light projection pattern useful for spot-lighting.
Figure 10B:
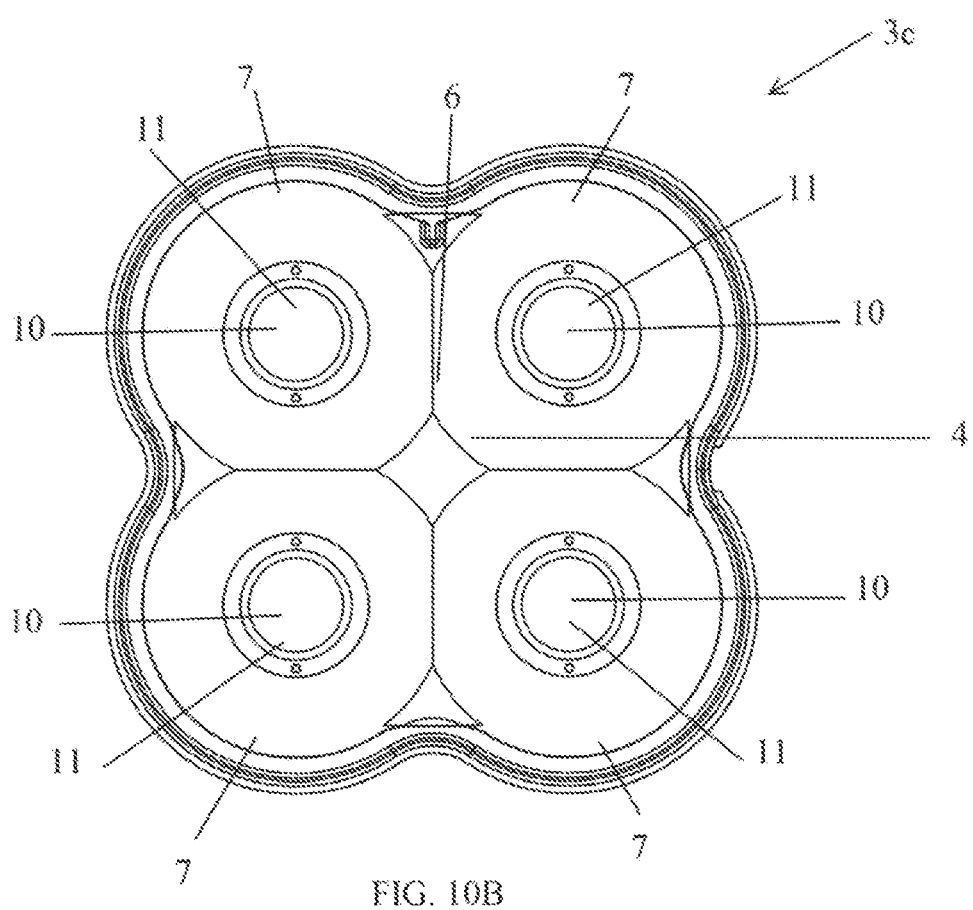
Figure 10C:
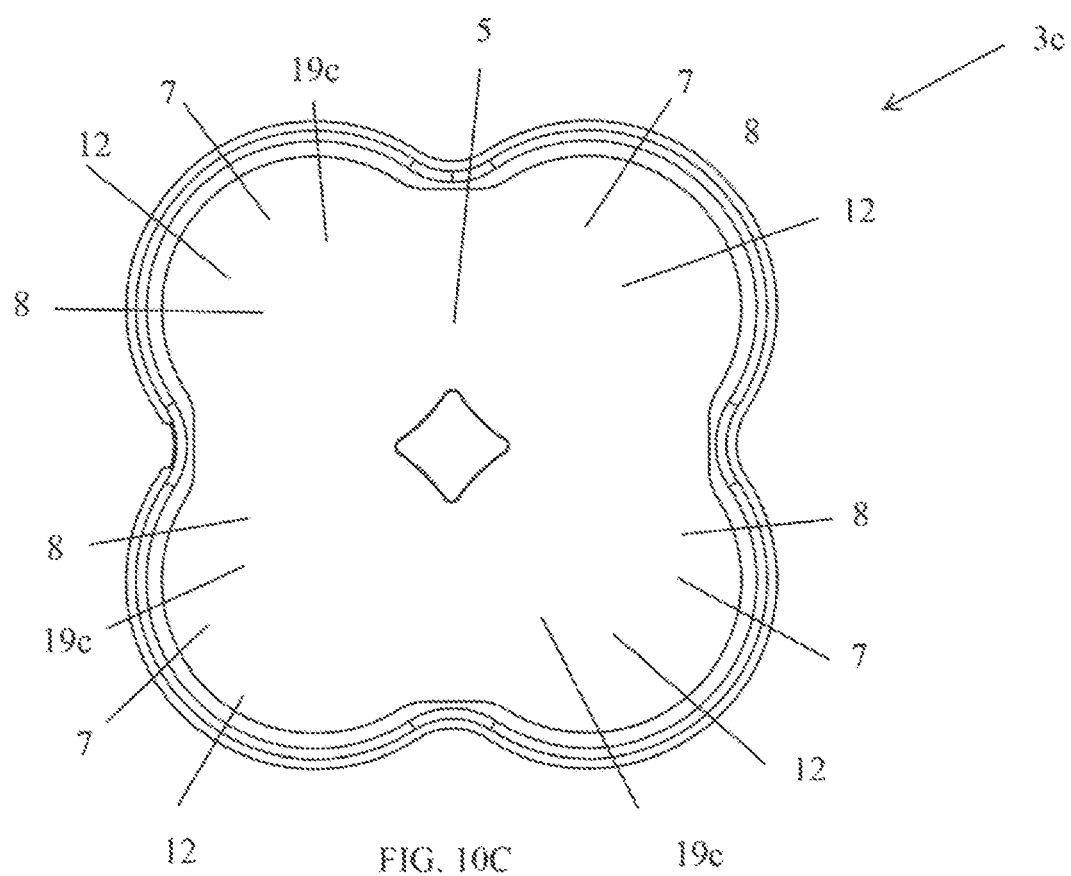
Figure 10D:
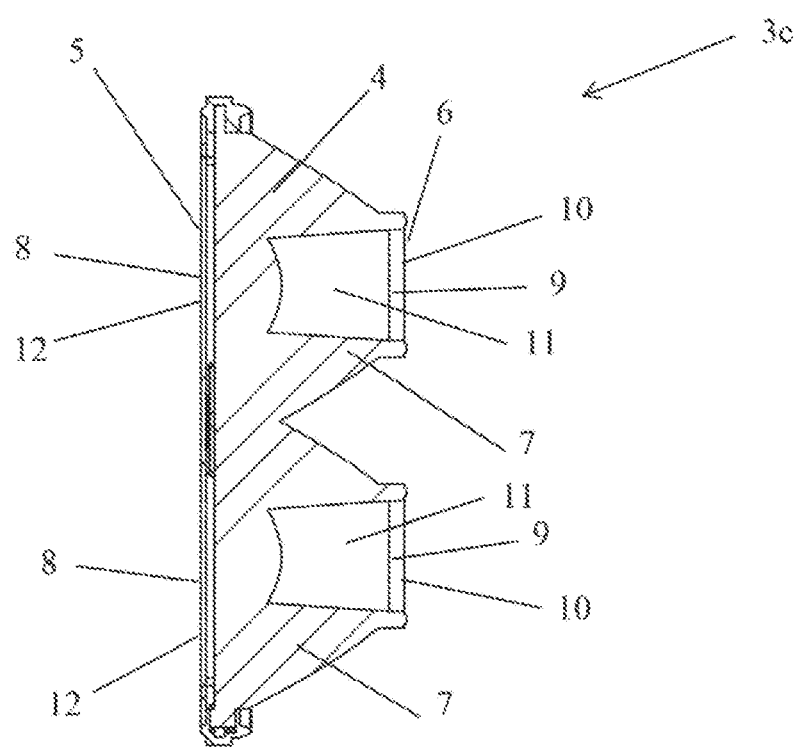
Figure 11A:
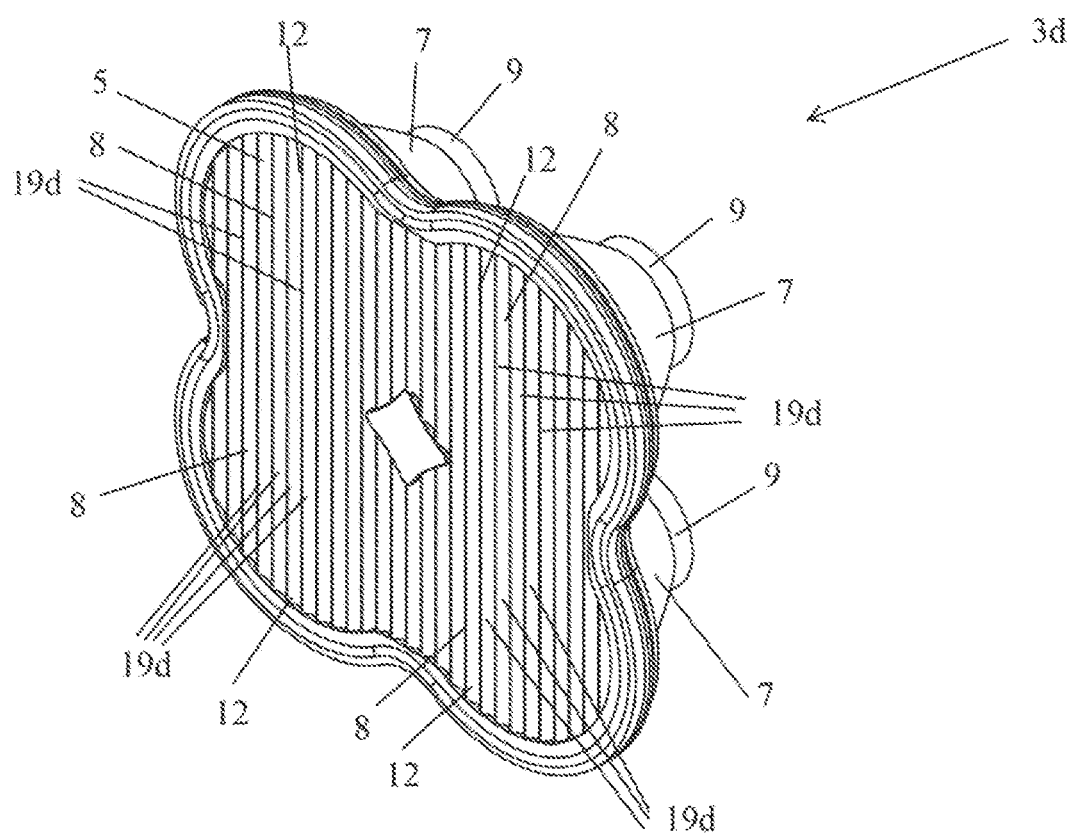
FIGS. 11A-11D are respectively a perspective view, rear elevation view, front elevation view and section view of a fourth lens module of a preferred embodiment lamp according to the present invention. The lens module has a plurality of lens units formed in it that create a light projection pattern useful as fog lights.
Figure 11B:
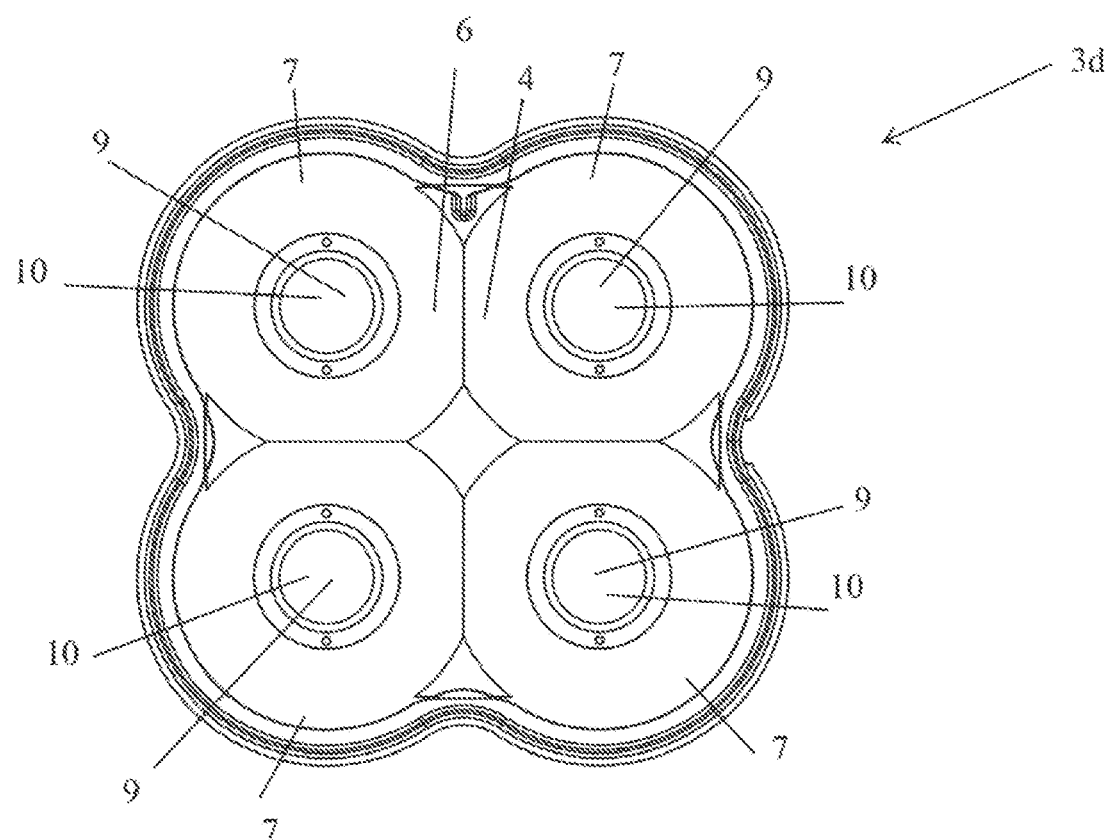
Figure 11C:
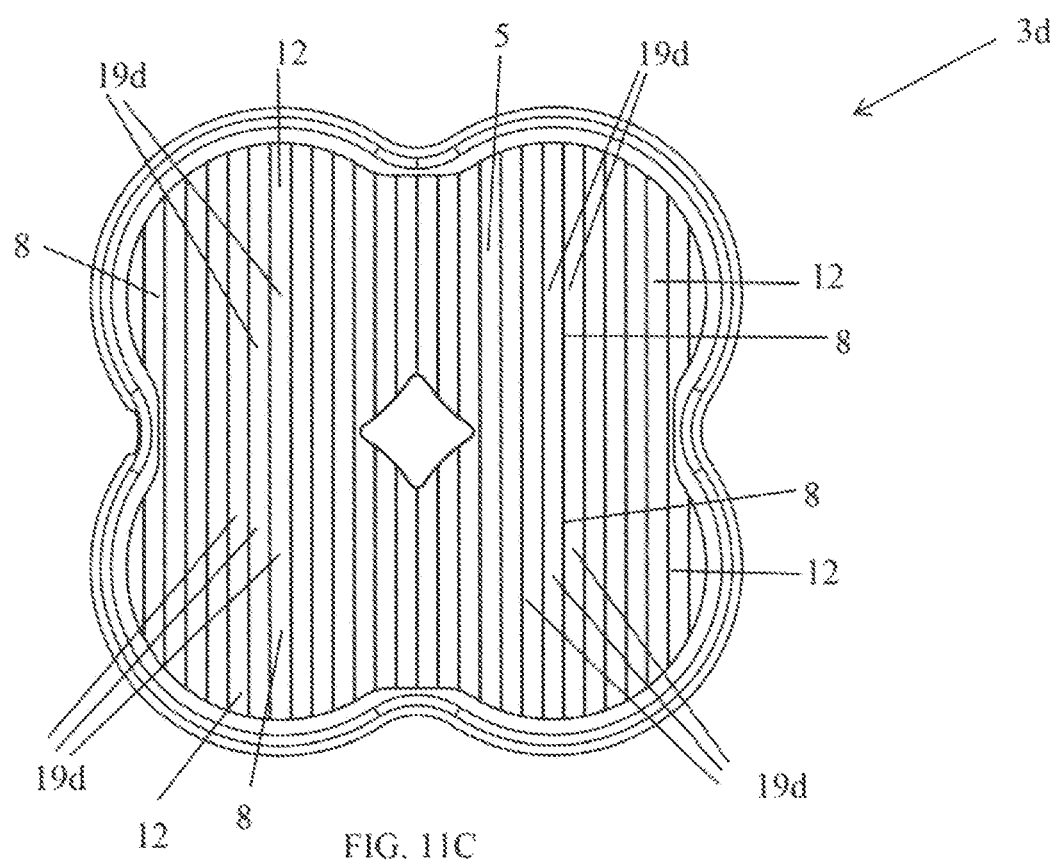
Figure 11D:
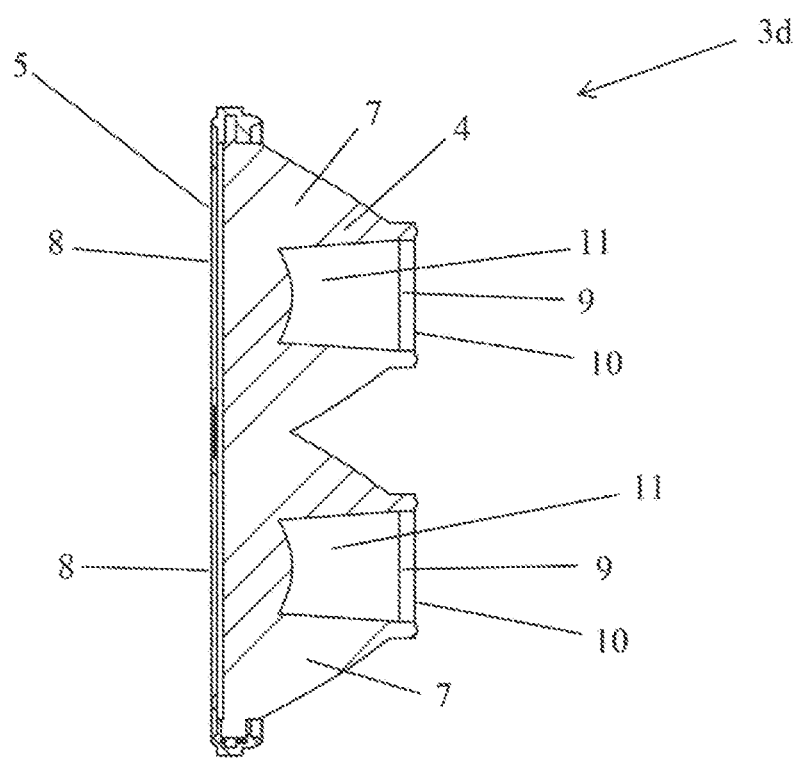

In the depicted preferred embodiment housing 2 is formed from aluminum. PCB 15 is received in a recess formed in housing 2. The exterior surface of housing 2 preferably includes a plurality of heat sink fins or pins 18 to dissipate heat from LEDs 13. FIGS. 3 through 6 show a preferred shape and structure for embodiment housing 2. FIG. 7 shows a preferred shape and structure for an embodiment bezel 14 that is used to secure lens module 3 into embodiment housing 2.

In operation, each of the one or more LEDs 13 directly projects light to incident surface 10 of a respective one of the one or more lens units 7. Unlike other vehicle lamps, present invention lamp 1 has no reflector cavity in housing 2. In this regard, lamp 1 excludes any reflecting structures shaped or positioned to direct the light projected by each light source 13 to incident surface 10 of its respective one of the one or more lens units 7. Lamp 1 additionally includes sealing bezel 14 that along with flexible seal 25 seals lens module 3 to the housing 2 in order to keep dust and liquid from getting inside lamp 1. Seal 25 is preferably made from flexible and resilient silicone and is shaped to follow and snugly contact the perimeter outer flange 26 of lens module 3. In further contrast to prior art lamps, when lens module 3 is sealed to housing 2 by sealing bezel 14, lamp 1 includes no other light-transmitting structures external to outer surface 5 of the lens module 3. This makes inventive lamp 1 lighter than prior art lamps.

LEDs 13 are installed and arranged on PCB 15 such that each LED is optimally aligned and positioned with respect to a lens unit 7. As noted, each lens unit 7 has an emission surface 8 that is specially formed for a particular illumination pattern. In this respect, the emission surface can, by way of example, be made planar, curved, or with a surface pattern. Additionally or alternatively, emission surface 8 may be formed with optical surface treatments such as Fresnel surface formations, knurling, frosting, pillowing or other texturing to disperse, concentrate or otherwise direct light emitted from lamp 1. Lens module 3 and its constituent lens units 7 are preferably made of a transparent plastic material with optically polished surfaces, which allow light to pass through it.

By forming emission surface 8 with optical treatments, a lamp 1 of the present invention can be constructed to throw a variety of beam patterns. For example, FIGS. 8A-8D depict lens module 3a having a plurality of lens units 7 formed in it with low convexity pillowed surface features 19a forming a grid in outer surface 5. The formed surface features 19a create a light projection pattern useful for general driving conditions.

FIGS. 9A-9D depict lens module 3b having a plurality of lens units 7 formed in it that create a light projection pattern useful for flood lighting. Emission surface 8 of each lens unit 7 has high convexity pillowed features 19b forming a grid in outer surface 5.

FIGS. 10A-10D depict lens module 3c having a plurality of lens units 7. Each lens unit 7 has an emission surface 8 formed with planarized surface feature 19c giving outer surface 5 a smooth appearance. Lens module 3c creates a light projection pattern useful for spot lighting.

FIGS. 11A-11D depict lens module 3d having a plurality of lens units 7. Each lens unit 7 has an emission surface 8 having surface features 19d formed in it that result in outer surface 5 having a pattern of parallel and adjacent linear formations that create a light projection pattern useful for fog lights.

In contrast to prior art lamps that have flat or smooth outer lenses intended to seal overall lamp structure, a lamp constructed in accordance with the present invention can be made more efficiently and with less material. The key to the invention is making a lens module 3 with the correct optical features that maintain the durability of the lamp that in the past had been provided by the covering outer lens. The outer lens of the prior art lamp serves a triple function: a) it may modulate the beam pattern; b) it protects the internal lamp components from impact from road debris; and c) it seals those components from outside dust and contaminants. Thus, as a primary concern, eliminating the outer lens module requires that lens module 3 be made of a light-transmissible material in which light-modulating optical features can be formed. With no protective outer cover, the lens module not only has to be durable enough to withstand damage from debris, rocks and gravel, but it has to able to be cleaned effectively to remove illumination-reducing dirt that would accumulate on outer surface 5.

In tests of various materials considered for use in making the lens module, a silicone-based material was found to lack the rigidity needed for optical performance. However, it was discovered that making a lens unit out of a polycarbonate material of a sufficient thickness resulted in a lens unit in which the necessary optics could be formed, provided the durability required of a vehicle lamp and was also easy to clean. It was found that prototype lens modules having a thickness of about 24.23 mm from outer surface 5 to inner surface 6 could be made to produce light distribution patterns for general driving, flood, spot and fog needs and that met SAE illumination requirements for general driving and fog lights. With the thickness dimension and roughly square shape shown in the drawings, lens module 3 has a preferred side dimension of 77.51 millimeters.

Tests on prototype lamps also showed that an embodiment lens module manufactured in accordance with the present invention helped to transmit heat to outer surface 5 of lens module 3, which action advantageously melted snow and ice better than found in prior art lamps. Having formed a lens module that satisfied criteria for illumination and durability, tests were then undertaken to come up with a method to hold and seal the lens module to a housing. The result of the tests was embodiment housing 2, bezel 14 and seal 25 shown in the figures.

Figure 2D:
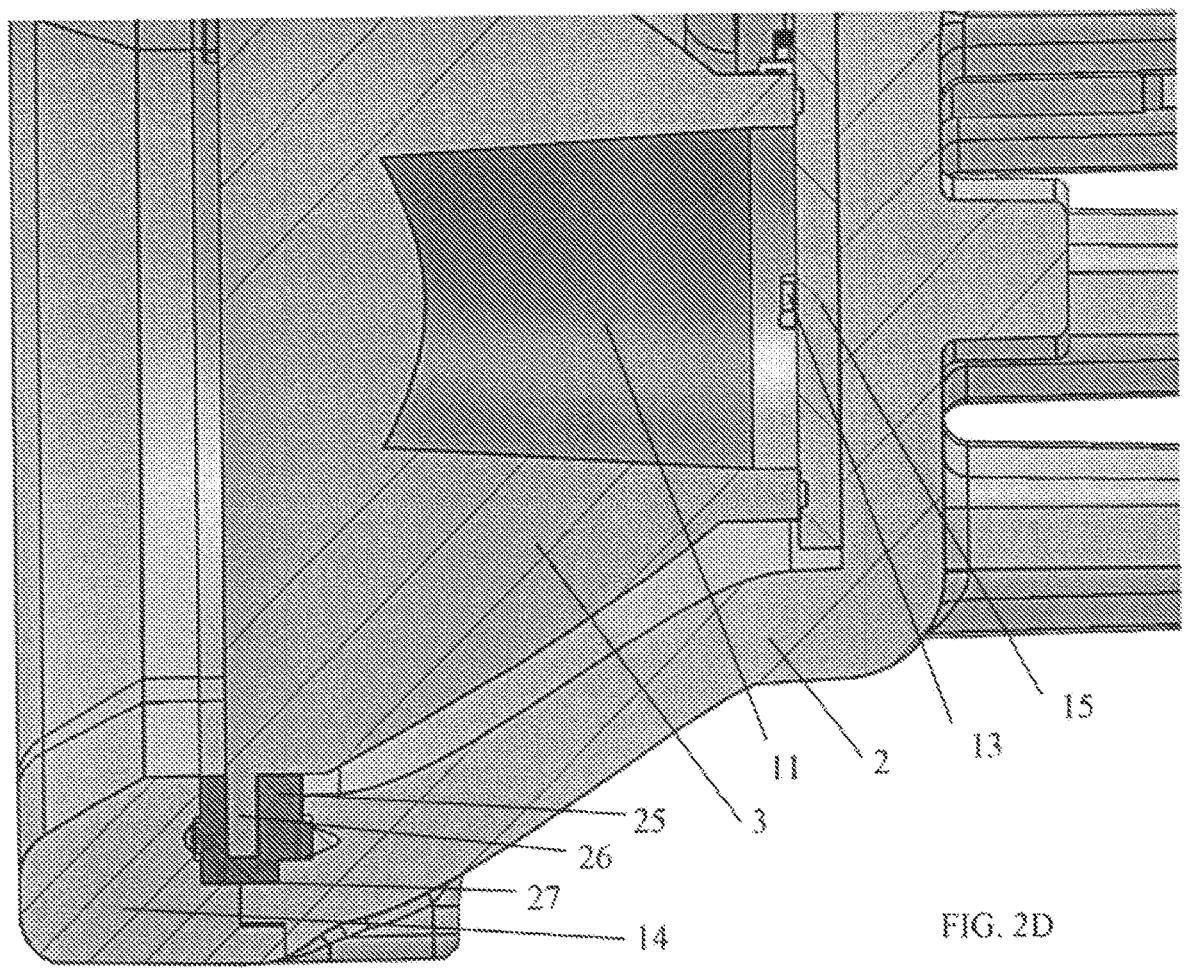
FIG. 2D is a partial section view of a preferred embodiment lamp according to the present invention showing the arrangement of the housing, lens module and bezel to form the lamp, with the lamp's seal installed between the lens module and the housing.
Figure 3:
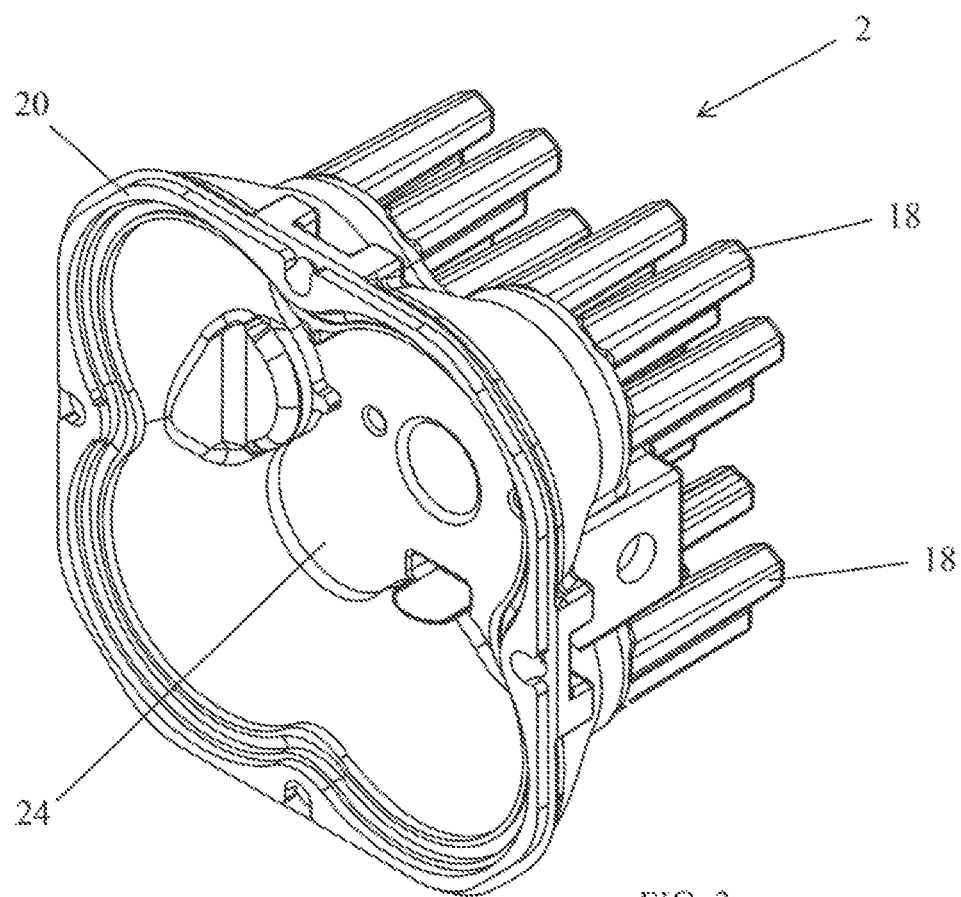
FIG. 3 is a perspective view of the housing of a preferred embodiment lamp according to the present invention.
Figure 4:
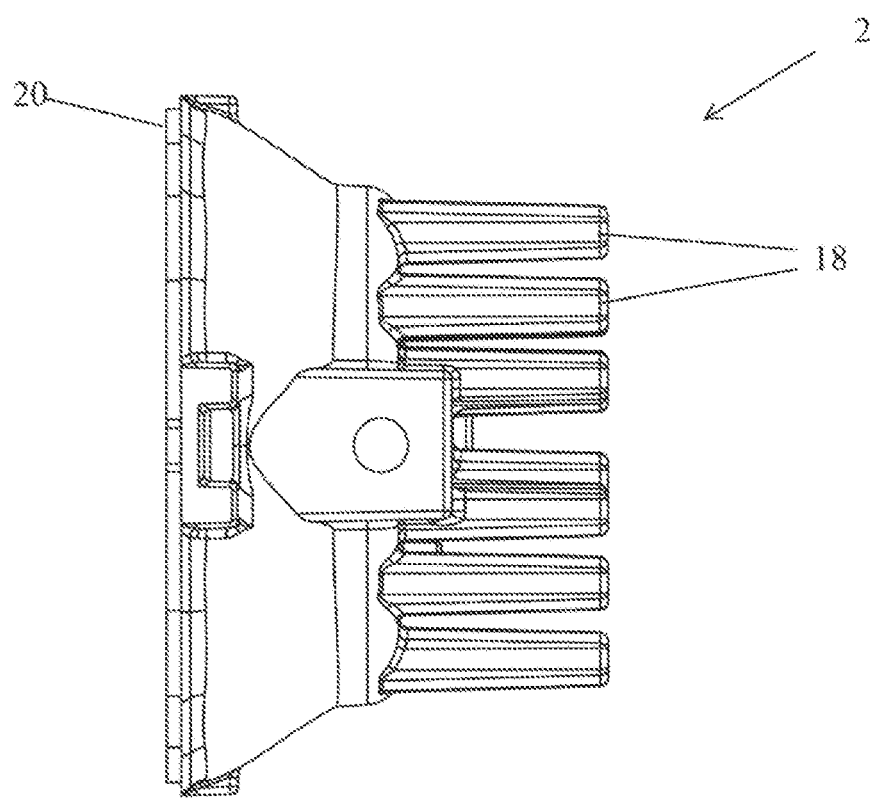
FIG. 4 is a side elevation view of the housing of a preferred embodiment lamp according to the present invention.
Figure 5:
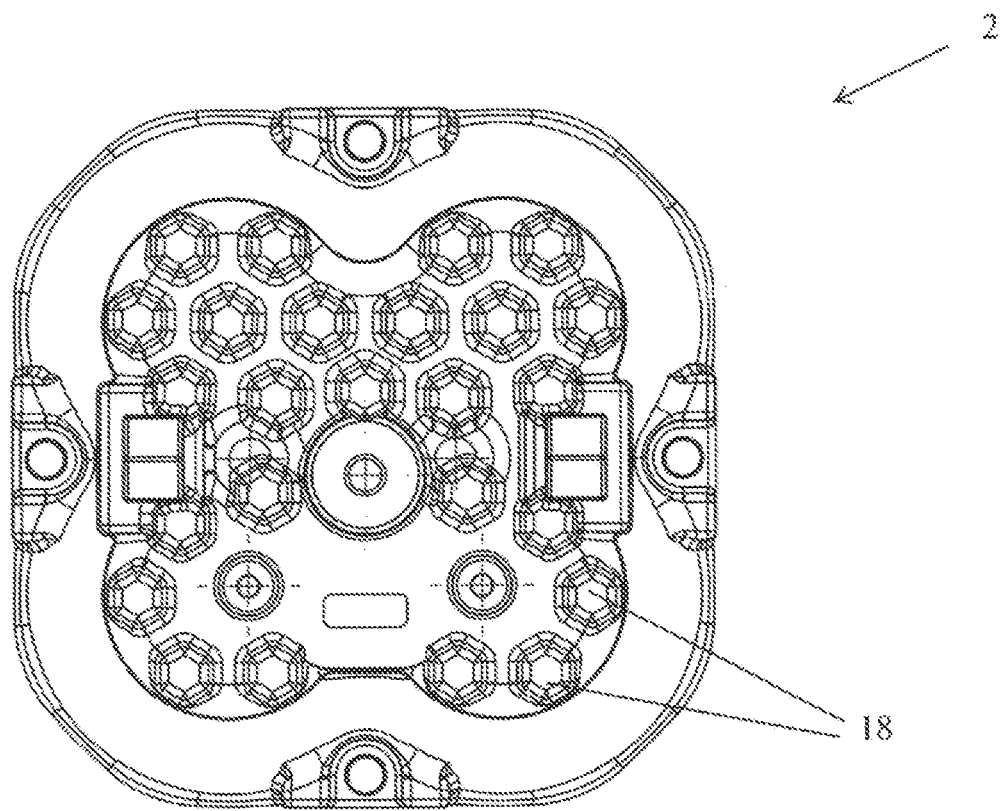
FIG. 5 is a rear elevation view of the rear portion portion of the housing of a preferred embodiment lamp according to the present invention.
Figure 6:
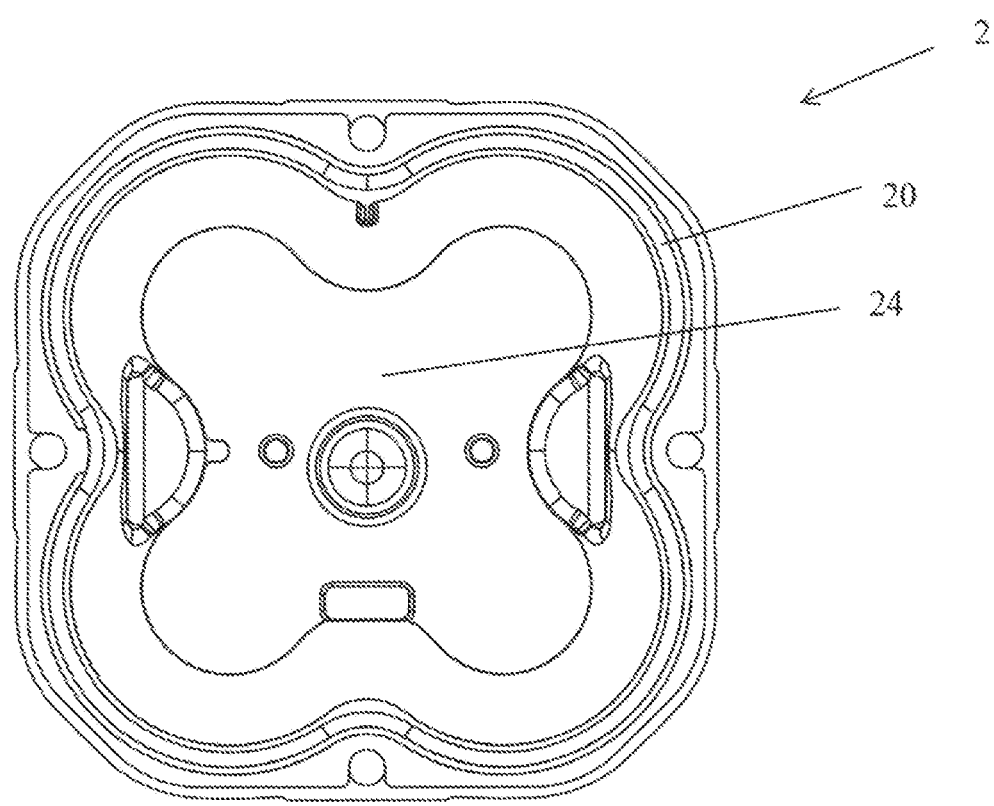
FIG. 6 is a front elevation view of the housing of a preferred embodiment lamp of the present invention that shows the interior cavity of the housing.

As best shown in FIG. 2D, when bezel 14 is engaged to housing 2, channel 27 is formed about their perimeter engagement. When all components are assembled, channel 27 houses U-channeled seal 25 that is held to and receives outwardly extending perimeter flange 26 of lens module 3. To seal lens module 3 to housing 2, lens module with attached seal 25 is placed in housing 2. Bezel 14 is then preferably bolted on rim 20 of housing 2. Upon doing so channel 27 is formed and frictionally receives flange 26, which is enveloped by seal 25. In the preferred embodiment, bezel 14 is made from aluminum and housing 2 is also made from aluminum. By virtue of the friction fit between them, bezel 14 securely holds lens module 3 to housing 2, with seal 25 preventing the ingress of dust and water into housing 2. Tests showed that in the described formation in which bezel 14 is attached to housing 2 with lens module 3 bearing seal 25 and interposed between bezel 14 and housing 2, PCB 15 and interior 24 of housing 2 remained dry during prolonged water-dunk and pressure spray testing. Seal 25 is preferably made from silicone and its placement at the level of the main lamp optics is distinct from prior art lamps.

A lamp constructed in accordance with the inventive features described herein may be utilized in a wide variety of motor vehicles for motive illumination. The type of motor vehicle may include, but is not limited to, a land vehicle such as a passenger sedan, a sport utility vehicle, a minivan, a truck (light or heavy truck) and a recreational vehicle (e.g., ATV, motorcycle, snowmobile). Alternatively the motor vehicle may also include water vehicles (e.g. boats, jet-skis, personal water craft) and air vehicles (e.g. planes, helicopters). The lamp herein described can also be used in non-motor vehicle applications in residences, commercial establishments and industrial venues.

A lamp constructed in accordance with the description provided herein may include LEDs 13 that express white or colored light and their arrangement on PCB 15 is not limited to the embodiment shown in the drawings. A lamp 1 constructed in accordance with the present invention receives a power supply (not shown). The power supply may receive power from a power source, such as a car battery that is electrically coupled to the power supply by electrical wiring. The power supply may comprise a housing containing a constant current power supply for exciting the LED chips. The output of the power supply to lamp 1 may be controlled by a feedback loop which includes a sense resistor, which may be located in lamp 1, or any other suitable location. In certain embodiments of the present disclosure, a controller, a power source or both may be included in the power supply and contained within housing 2.

While preferred embodiments of the invention have been described herein, it will be recognized and understood that various modifications may be made therein. The claims that follow are intended to cover all such modifications that may fall within the spirit and scope of the invention.

What is claimed is:

1. A lamp comprising:
   a housing;
   a molded lens module made of a light-transmitting material;
   the lens module having an outer surface and an inner surface;
   the lens module including one or more lens units integrally formed in the light-transmitting material of the lens module;
   each lens unit having an emission surface and a light gathering portion, the light gathering portion including an incident surface;
   each lens unit further including a solid light-path portion formed from the light transmitting material and disposed between the incident surface and the emission surface of the lens unit;
   the emission surface of each of the one or more lens units being a portion of the outer surface of the lens module;
   one or more light sources, each of the one or more light sources directly projecting light to the incident surface of a respective one of the one or more lens units;
   the lamp excluding any reflecting structures shaped or positioned to direct the light projected by any light source to the incident surface of its respective one of the one or more lens units;
   a flange, the flange being a perimeter flange projecting outwardly from a perimeter of the lens module, the flange being continuous and extending completely around the perimeter of the lens module;
   a seal, the seal having a U-channel shaped to receive the flange m the U-channel of the seal with the seal extending completely around the flange;
   a bezel, the bezel being a sealing bezel that is attachable to the housing and forms a channel around a perimeter engagement between the bezel and the housing;
   the lens module is positioned between the housing and the bezel with the flange of the lens module received in the U-channel of the seal and the seal received in the channel formed around the perimeter engagement between the bezel and the housing, the seal engaging in sealing engagement with both the housing and the bezel thereby sealing the lens module to the housing with the bezel attached to the housing; and,
   wherein when the lens module is sealed to the housing by the sealing bezel, the lamp includes no other light-transmitting structures external to the outer surface of the lens module.

2. The lamp of claim 1 wherein the outer surface of the lens module is planar.

3. The lamp of claim 2 wherein the outer surface is smooth.

4. The lamp of claim 2 wherein the outer surface has formed in it a grid.

5. The lamp of claim 2 wherein the outer surface has formed in it an array of externally convex elements.

6. The lamp of claim 2 wherein the outer surface has formed in it an array of parallel lines.

7. The lamp of claim 5 wherein the externally convex elements are uniformly sized and shaped.

8. The lamp of claim 1 wherein the flange has an outer surface directed toward the outer surface of the lens module and the flange has an inner surface directed toward the inner surface of the lens module, the flange outer surface projecting outwardly from the perimeter of the lens module and being coplanar with the outer surface of the lens module.

* * * * *